United States Patent [19]
Eckstein et al.

[11] Patent Number: 5,615,838
[45] Date of Patent: Apr. 1, 1997

[54] IN-LINE RETENTION DRIP EMITTER

[75] Inventors: Gershon Eckstein; Eran Eckstein, both of San Diego, Calif.

[73] Assignee: Drip Irrigation Systems, Ltd., San Diego, Calif.

[21] Appl. No.: 401,853

[22] Filed: Mar. 10, 1995

[51] Int. Cl.⁶ .................................................. B05B 1/30
[52] U.S. Cl. ...................... 239/533.1; 239/542; 239/547
[58] Field of Search ............................ 239/542, 547, 239/533.1

[56] References Cited

U.S. PATENT DOCUMENTS

| | | | |
|---|---|---|---|
| 3,685,735 | 8/1972 | Foster | 239/109 |
| 3,779,468 | 12/1973 | Spencer | 239/542 |
| 3,797,741 | 3/1974 | Spencer | 239/11 |
| 3,814,377 | 6/1974 | Todd | 251/145 |
| 3,896,999 | 7/1975 | Barragan | 239/107 |
| 3,976,250 | 8/1976 | Bentzinger | 239/533 |
| 4,009,832 | 3/1977 | Tiedt | 239/542 |
| 4,100,940 | 7/1978 | Spears | 137/877 |
| 4,177,946 | 12/1979 | Sahagin-Barragan | 239/533.1 |
| 4,687,143 | 8/1987 | Gorney et al. | 239/542 |
| 4,817,666 | 4/1989 | Sanville | 137/596.17 |
| 5,111,996 | 5/1992 | Eckstein | 239/542 |
| 5,236,130 | 8/1993 | Hadar | 239/542 |
| 5,279,462 | 1/1994 | Mehouder | 239/542 |
| 5,413,282 | 5/1995 | Boswell | 239/542 |
| 5,443,212 | 8/1995 | Dinur | 239/542 |

FOREIGN PATENT DOCUMENTS

| | | |
|---|---|---|
| 0444425 | 9/1991 | European Pat. Off. . |
| 0620966 | 10/1994 | European Pat. Off. . |
| 0636309 | 2/1995 | European Pat. Off. . |
| 3913619 | 10/1990 | Germany . |
| 93/02547 | 2/1993 | WIPO . |

OTHER PUBLICATIONS

Netafim Irrigation Equipment & Drip Systems promotional leaflet, "Compensating Non Leakage (C.N.L.) Dripper", 12–92CNL1–1.

IRRI Gazette (European Irrigation Magazine), No. 16, 1993 edition, p. 9. ISSN 1153–0561 published in Israel.

Primary Examiner—Lesley D. Morris
Attorney, Agent, or Firm—Edward B. Anderson

[57] ABSTRACT

A generally cylindrical or partially cylindrical body is intimately received in an irrigation pipe and has an outer surface in physical contact with an inner surface of the pipe. A flow-limiting labyrinth is formed by the outer surface of the body in combination with the pipe inner surface. A valve chamber is formed in the body and has four pairs of inlets and outlets forming an inlet retention valve and three labyrinth bypass valves. The first inlet is in fluid communication with the pipe interior and the first outlet is in fluid communication with the labyrinth inlet end. The inlet retention valve includes a first valve seat that surrounds the first inlet. Each bypass valve is connected between a respective section of the labyrinth and an external pipe outlet. The retention valve prevents flow through the emitter when pipe internal water pressure is below a minimum pressure, and the bypass valves close progressively to increase the effective and actual length of the labyrinth for increasing water pressure above the minimum pressure.

19 Claims, 13 Drawing Sheets

IN-LINE RETENTION DRIP EMITTER

BACKGROUND OF THE INVENTION

1. Field of the Invention

This invention relates to irrigation drip emitters, and in particular to in-line drip emitters having a water-retention valve for preventing the draining of water from the associated pipe during periods of low water pressure, and to such emitters providing pressure compensation.

2. Related Art

A drip irrigation system applies water to specific plant or root zone locations in very small controlled quantities. This allows plants to be grown with substantially less water than is used with surface flooding and broadcast drip irrigation methods. It has been found that yet further reduced water use is made possible by employing periodic short time emitter discharges or pulses of water in the range of 0.1 to 0.4 liters per hour. This lowers the water use by an order of magnitude over conventional constant flow drip irrigation methods.

The newer intermittent drip irrigation method reduces soil saturation, watering beyond plant root zones, and on-surface run-off. This results in improved plant physiology, fertilizer distribution, and moisture take up by the plants.

With conventional emitters, water resident in the irrigation tubing after water pressure is turned off bleeds through the emitter, leaving the tubing empty. When irrigation is resumed the tubing must be refilled before all the emitters will emit water. Thus, conventional emitters cannot be used with pulsed irrigation methods because of the extended period of time required to refill the irrigation pipe.

Initially, emitters were developed for mounting on the exterior of an irrigation pipe by inserting an inlet tube through the wall of the pipe. These external or on-line emitters are completely self contained and require individual handling for installation on an irrigation pipe. An external emitter has been developed which prevents the leakage of water from the pipe during periods of low pressure by the use of a membrane that is biased across an inlet opening. Between high-pressure pulses, the water is retained in the irrigation pipe. This allows for the immediate operation of the emitters when water pressure is increased. At relatively high pressures, the membrane is forced away from the inlet, allowing the water to flow into a labyrinth built into the body of the emitter. One such emitter is described as a compensating non-leakage dripper and sold by Netafim Irrigation Equipment & Drip Systems of D. N. Hanegev 4, Israel. This emitter further provides pressure compensation by positioning the membrane between the emitter inlet and outlet, so that at higher pressures the outlet flow is reduced.

A second general type of emitter is the in-line emitter in which the irrigation pipe is made with the emitter enclosed within it. Such emitters typically are formed by a cylindrical or partially cylindrical insert having an outer surface which forms a labyrinth with the pipe interior wall surface. One end of the labyrinth is connected to the pipe interior and the other end is connected to the pipe exterior.

My prior U.S. Pat. No. 5,111,996 discloses an in-line emitter that provides pressure compensation by forcing water through progressively longer portions of the labyrinth. This is provided by serially restricting exit channels in response to increasing pressure. This emitter is effective in providing pressure compensation, but, like a conventional in-line emitter, does not prevent the drainage of the irrigation pipe during periods of low fluid pressure. There thus remains the need for an in-line emitter that retains water at low pressures in the irrigation pipe between high-pressure pulses, and particularly to such an emitter that also provides pressure compensation.

SUMMARY OF THE INVENTION

The present invention overcomes the shortcomings of the existing in-line emitters by providing an in-line emitter that retains low-pressure water in an irrigation pipe. Further, the present invention provides such an emitter that is readily made and is reliable in use. Further, in the preferred form of the invention, pressure compensation as well as water retention is provided in an economical form.

An in-line retention drip irrigation emitter made according to the invention has a flow-limiting passageway with an inlet end for receiving pressurized fluid from the pipe and an outlet end for conducting fluid to a pipe outlet opening. This emitter may be of cylindrical, partially cylindrical, or other suitable shape. A valve is responsive to fluid pressure in the pipe for closing the passageway when the fluid pressure in the pipe is below a minimum pressure and for opening the passageway when the fluid pressure in the pipe is above the minimum pressure. As a result, water is prevented from draining from within the pipe when the pipe fluid is at a reduced pressure. In such a general form of the invention pressure compensation is not required.

In one preferred embodiment of the invention, a generally cylindrical body is intimately received in an irrigation pipe and has an outer surface in physical contact with an inner surface of the pipe. A flow-limiting labyrinth is formed by the outer surface of the body in combination with the pipe inner surface. A valve chamber is formed in the body and has four pairs of inlets and outlets. The first inlet is in fluid communication with the pipe interior and the first outlet is in fluid communication with the labyrinth inlet end. A first valve seat surrounds the first inlet. The other inlets are in fluid communication with respective intermediate portions of the labyrinth, and the associated outlets are all in fluid communication with the labyrinth outlet end.

A resilient membrane is mounted in the valve chamber for separating the first inlet and outlet from the other inlets and outlets. The membrane is biased toward the valve seat for closing the first inlet when the fluid pressure in the pipe is below a minimum pressure and for opening the first inlet when the fluid pressure in the pipe is above the minimum pressure. The membrane further flexes toward the second, third and fourth outlets at pressures greater than the minimum pressure for varying the flow of fluid passing between the second, third and fourth inlets and the respective outlets. The amount of fluid passing through the labyrinth between the respective intermediate portion and the outlet end is thereby varied. The second, third and fourth outlets and associated valve chamber are structured so that the fluid flow through the outlets is varied over respective ranges of pressures to produce, for higher pressures, fluid flow through more of the labyrinth.

A second preferred embodiment functions similarly but has a partially cylindrical outer wall also forming a labyrinth and a generally flat inner wall. An emitter made according to the invention thus may be any size or shape that fits within an irrigation pipe and is attachable to the pipe wall.

Such an emitter thus provides for in-line positioning of the retention emitter, thereby avoiding the need for placement of an exteriorly mounted retention emitter. Further, the preferred emitter provides pressure compensation at pressures greater than a minimum pressure over a wide range of pressures by controlling the flow through different portions of the labyrinth. These and other features and advantages of the present invention will be apparent from the preferred embodiment described in the following detailed description and illustrated in the accompanying drawings.

DETAILED DESCRIPTION OF THE PREFERRED EMBODIMENT

Figure 1:
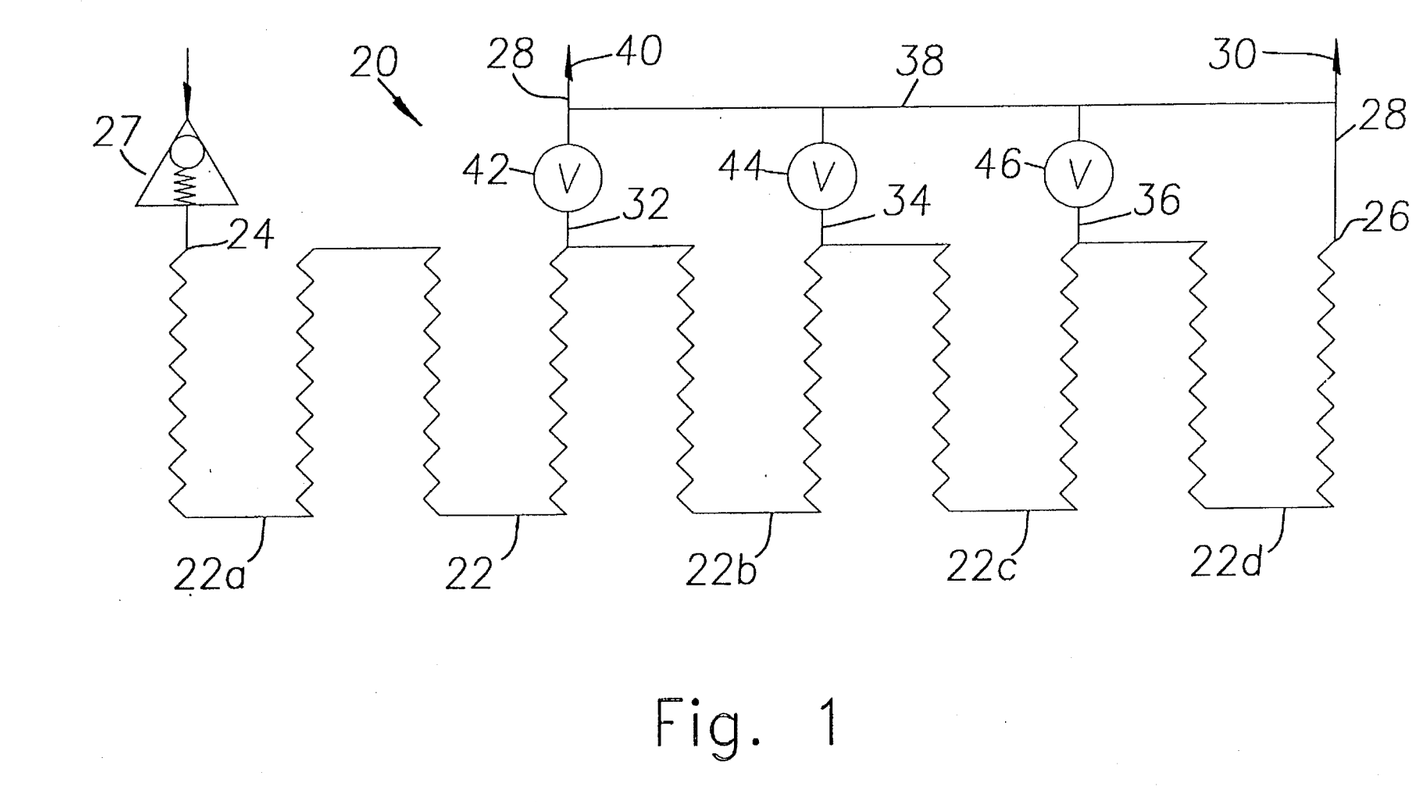
FIG. 1 is a general schematic of an emitter made according to the invention.
Figure 2:
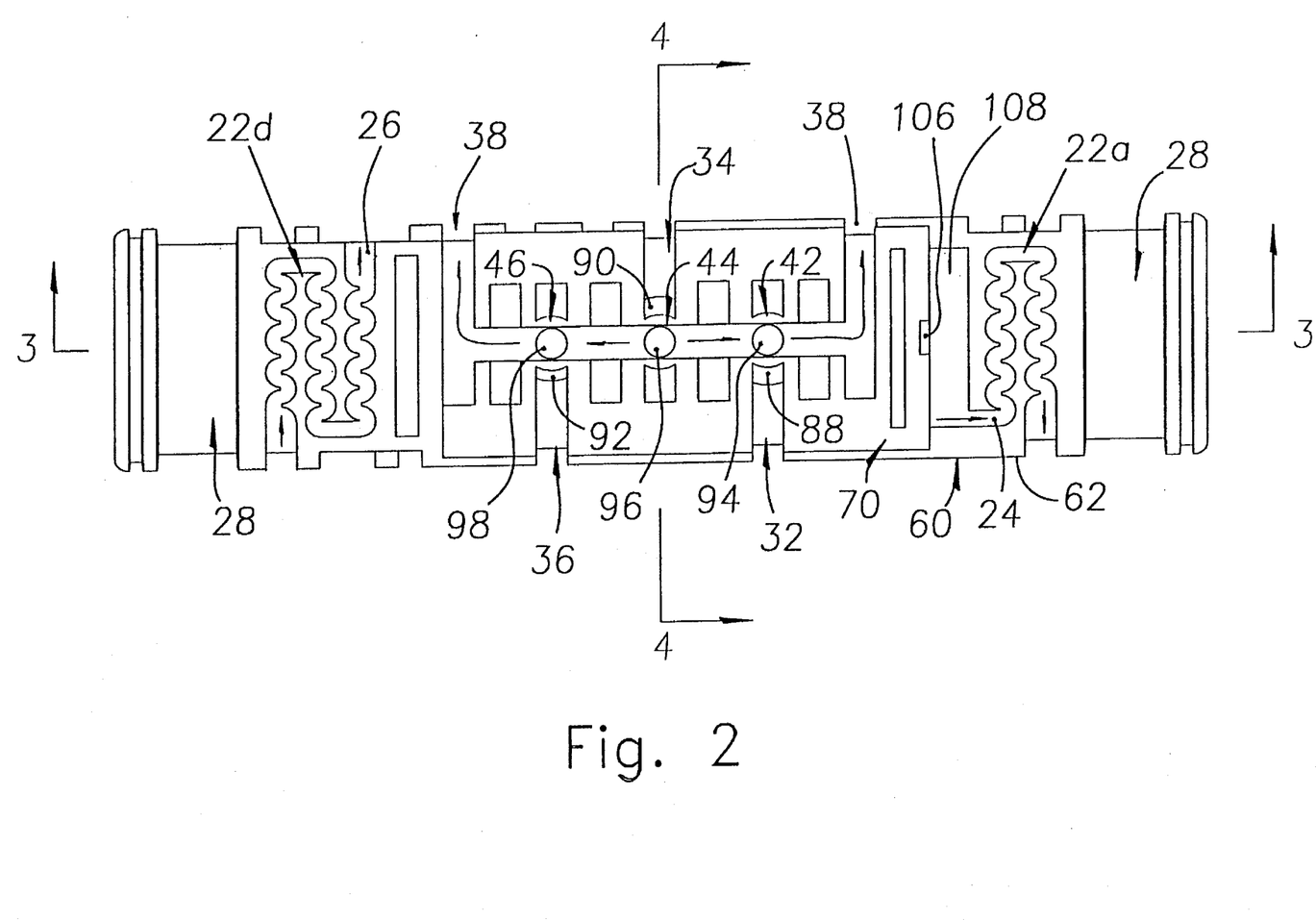
FIG. 2 is a side view of an emitter insert made with a main body element, a lid element, and a flexible membrane captured between the elements, according to the schematic of FIG. 1 for insertion in an irrigation pipe.

Referring initially to FIG. 1, a general schematic of an emitter 20 made according to the preferred embodiment of the invention is shown. Emitter 20 has an extended fluid-turbulence passageway or labyrinth 22 having an inlet end 24, an outlet end 26, and respective sections 22a, 22b, 22c and 22d. The inlet end receives pressurized fluid from an irrigation pipe or conduit through a check or retention valve 27. The primary function of valve 27 is to prevent the draining of water from within the irrigation pipe during periods when the water pressure in the pipe is below a minimum pressure, such as 7 psi. It also has a further advantage of preventing flow of external fluids or other material into the emitter and the pipe. The retention valve therefore preferably actively closes the inlet to the labyrinth at low pressures, in order to avoid water bleeding through the valve from within the pipe, as would occur if the inlet was simply passively closed, such as by a flapper valve.

The outlet end of the labyrinth is coupled via an outlet passageway or chamber 28 to a low-pressure opening represented by arrow 30 to the exterior of the irrigation conduit in which the emitter is operatively positioned. The labyrinth outlet end may also be directly coupled to opening 30.

Relatively free-flow fluid control channels 32, 34 and 36 are distributed serially along and in communication with labyrinth 22. Channel 32 is closest to the inlet end, and channel 36 is closest to the outlet end, as shown. Each control channel is also in communication with opening 30 via a bypass channel 38. Bypass channel 38 is also preferably coupled to a second conduit opening 40.

Positioned at channels 32, 34 and 36 are valves 42, 44 and 46, respectively. Each of these is responsive to the fluid pressure at the inlet end of the labyrinth for progressively closing and opening the channels. At low fluid pressures, all of the valves are open. Fluid will primarily flow in the path of least resistance, which is through labyrinth section 22a and out through channel 32 to bypass channel 38. As the pressure increases valve 42 starts closing, progressively reducing fluid flow in channel 32. This forces fluid diverted from channel 32 to continue flowing in the labyrinth through section 22b and out through channel 34.

As the fluid pressure in the conduit continues rising, valve 44 also progressively closes, forcing fluid to flow through an even longer labyrinth, represented by labyrinth sections 22a, 22b and 22c. As the fluid pressure continues to rise, valve 46 also begins closing, requiring the fluid to flow through the entire, and therefore maximum, length of labyrinth 22. By choosing appropriate pressures for valve operation, a relatively constant flow is achieved over a wide range of pressures.

Figure 3:
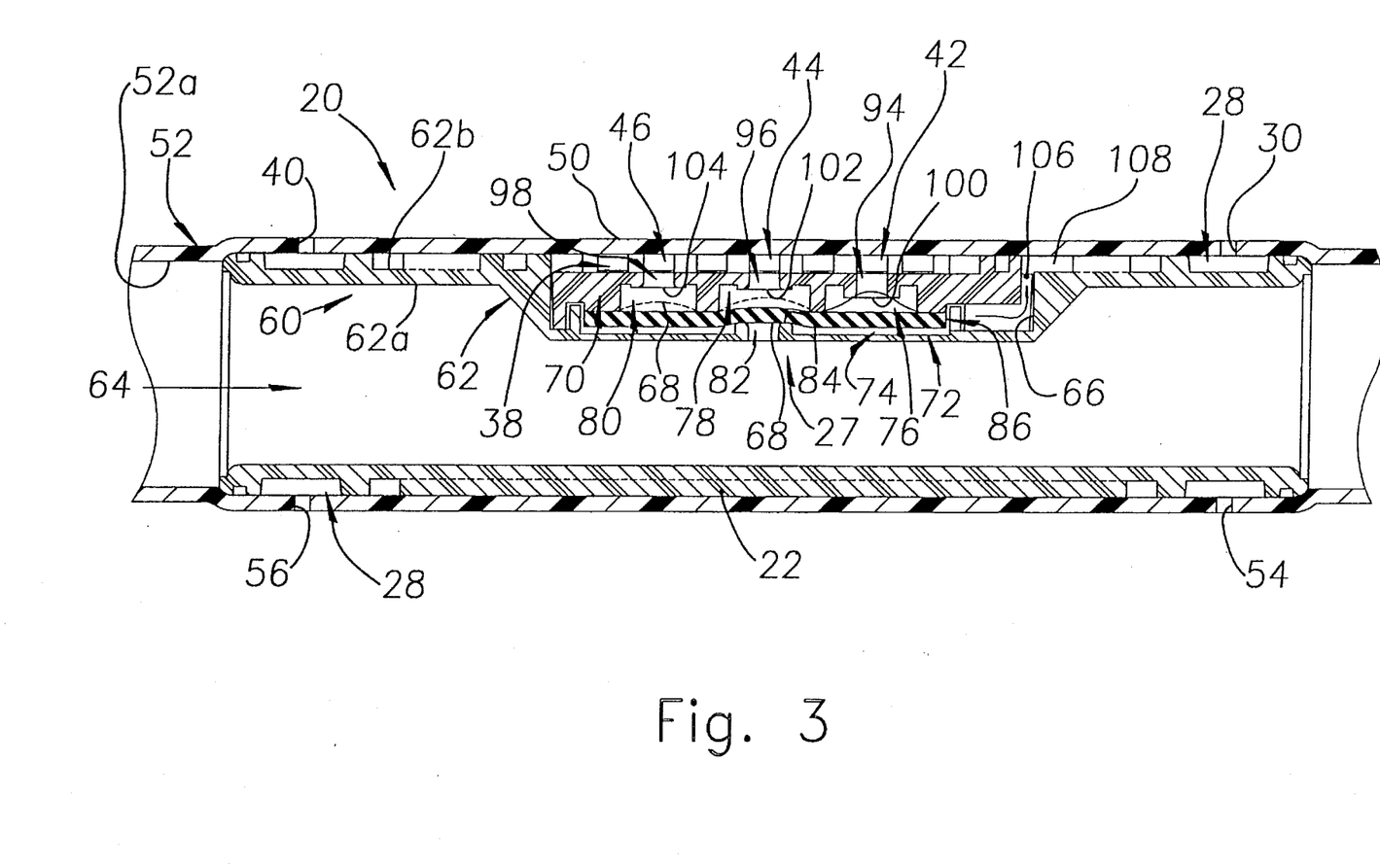
FIG. 3 is a cross section taken along line 3—3 in FIG. 2 with the insert positioned in an irrigation pipe.

Reference is now made to an embodiment of the invention shown in FIGS. 2–12 in which the reference numbers applied in the preceding discussion of FIG. 1 are also applied to features of the embodiment that are functionally the same. Emitter 20 is preferably formed of an outer member, such as sleeve 50, which typically is a portion of an irrigation pipe 52, as shown in FIG. 3. Sleeve 50 could also be inserted in an irrigation pipe. It may also be a member formed in or attached to a portion of a pipe and does not need to be a complete sleeve, depending on how the emitter is designed. Sleeve 50 has a plurality of openings, such as openings 30 and 40, discussed above, as well as openings 54 and 56. These openings assure that the fluid pressure at the outputs of control channels 32, 34 and 36 are at atmospheric pressure. The function of the valves is then only dependent on the internal pressure of the fluid in the pipe.

Disposed within sleeve 50 is an inner member formed as a generally tubular inner insert 60. As shown particularly in FIGS. 4–6, insert 60 includes a main element 62 with an inner surface 62a that defines, at least in part, an inner chamber 64 that preferably provides an uninterrupted continuation of the fluid flow inside conduit 52. Main element 62 has an outer surface 62b formed with channels and labyrinth sections which, when in position against the inner surface 52a of conduit 52, forms the completed labyrinth.

Figure 4:
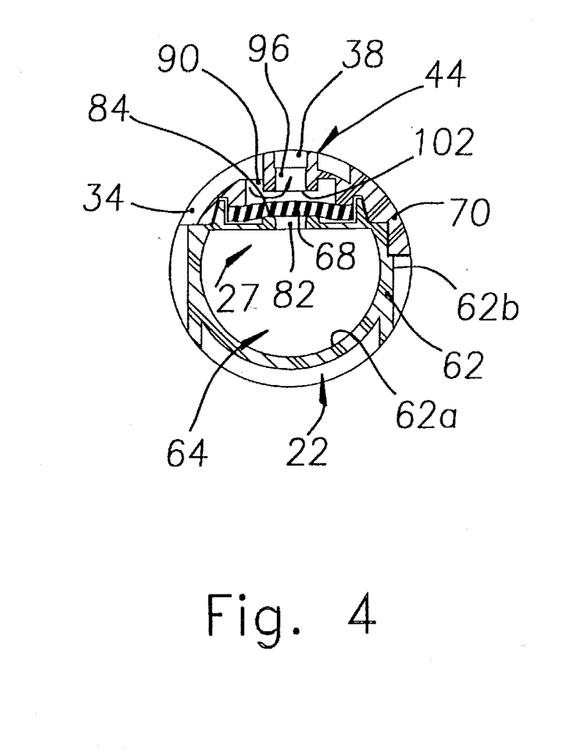
FIG. 4 is a cross section of the insert taken along line 4—4 in FIG. 2.
Figure 5:
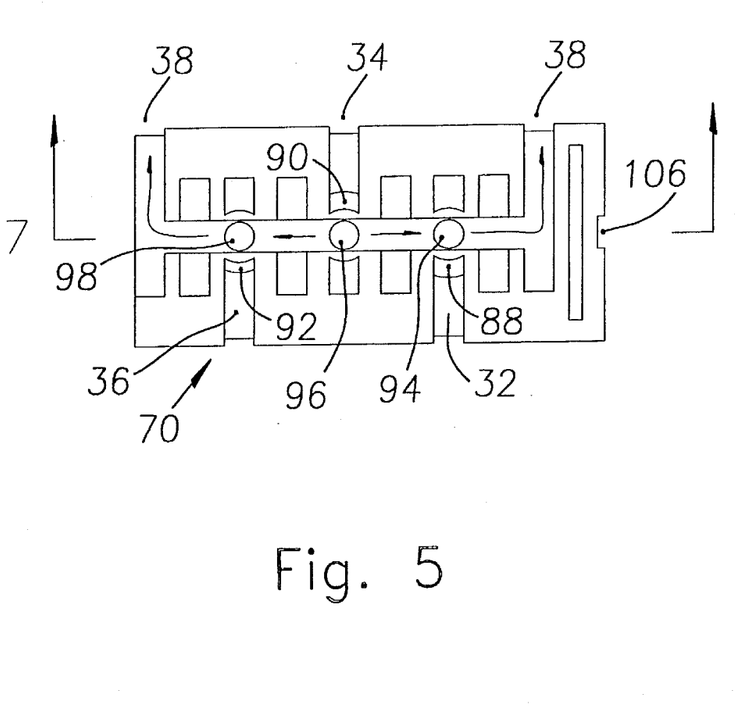
FIG. 5 is a view of the outer surface of the lid element of the insert of FIG. 2.
Figure 6:
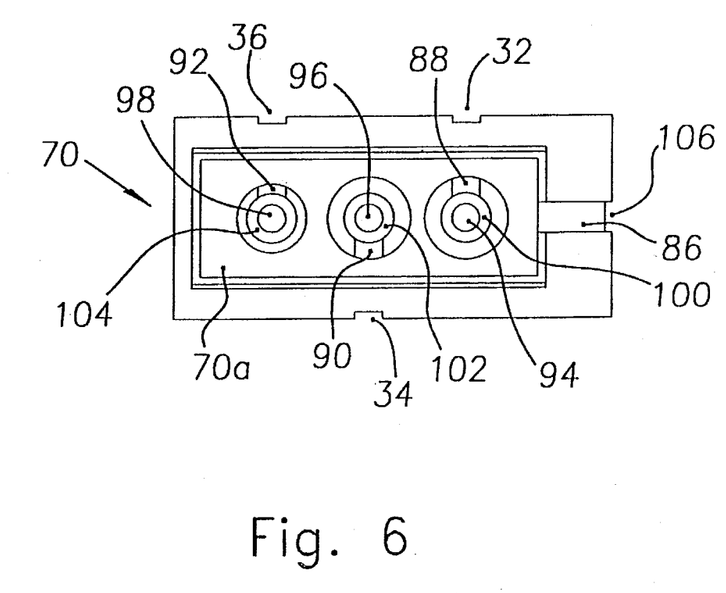
FIG. 6 is a view of the inner surface of the lid element of FIG. 5.
Figure 7:
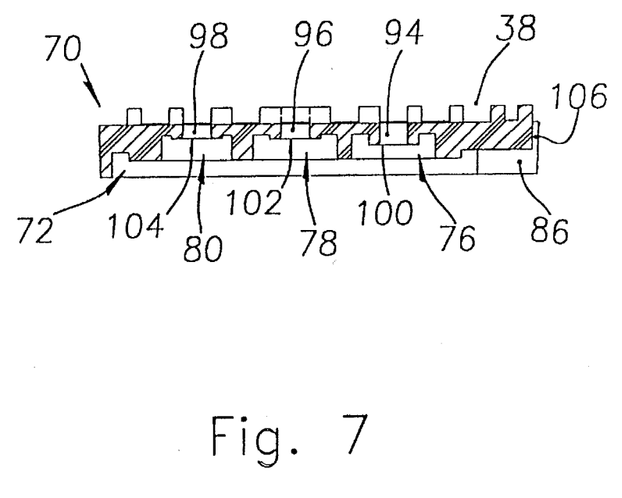
FIG. 7 is a cross section taken along line 7—7 in FIG. 5.
Figure 8:
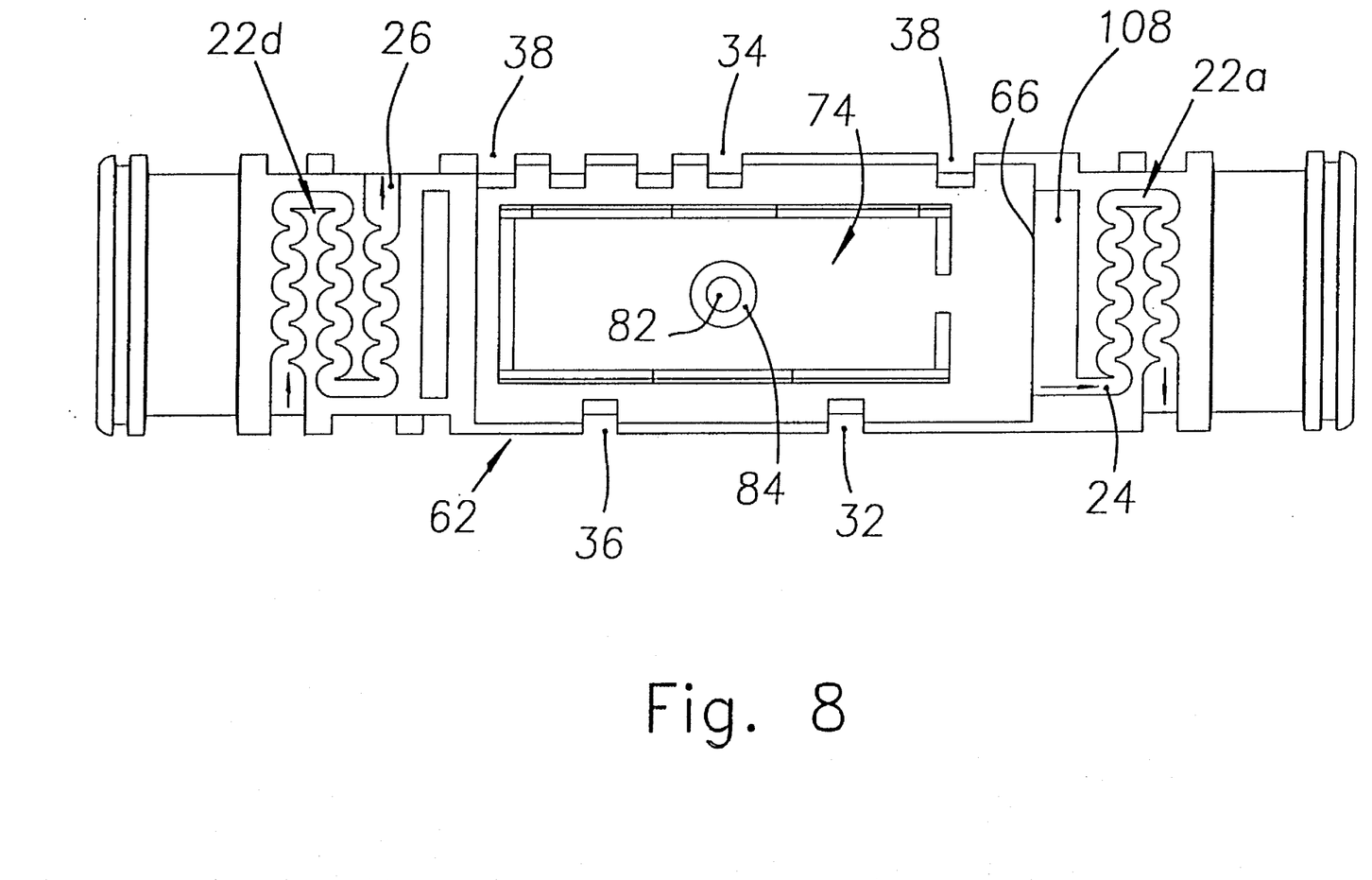
FIG. 8 is a top view of the main body element of the emitter insert of FIG. 2 but without the lid element or membrane.
Figure 9:
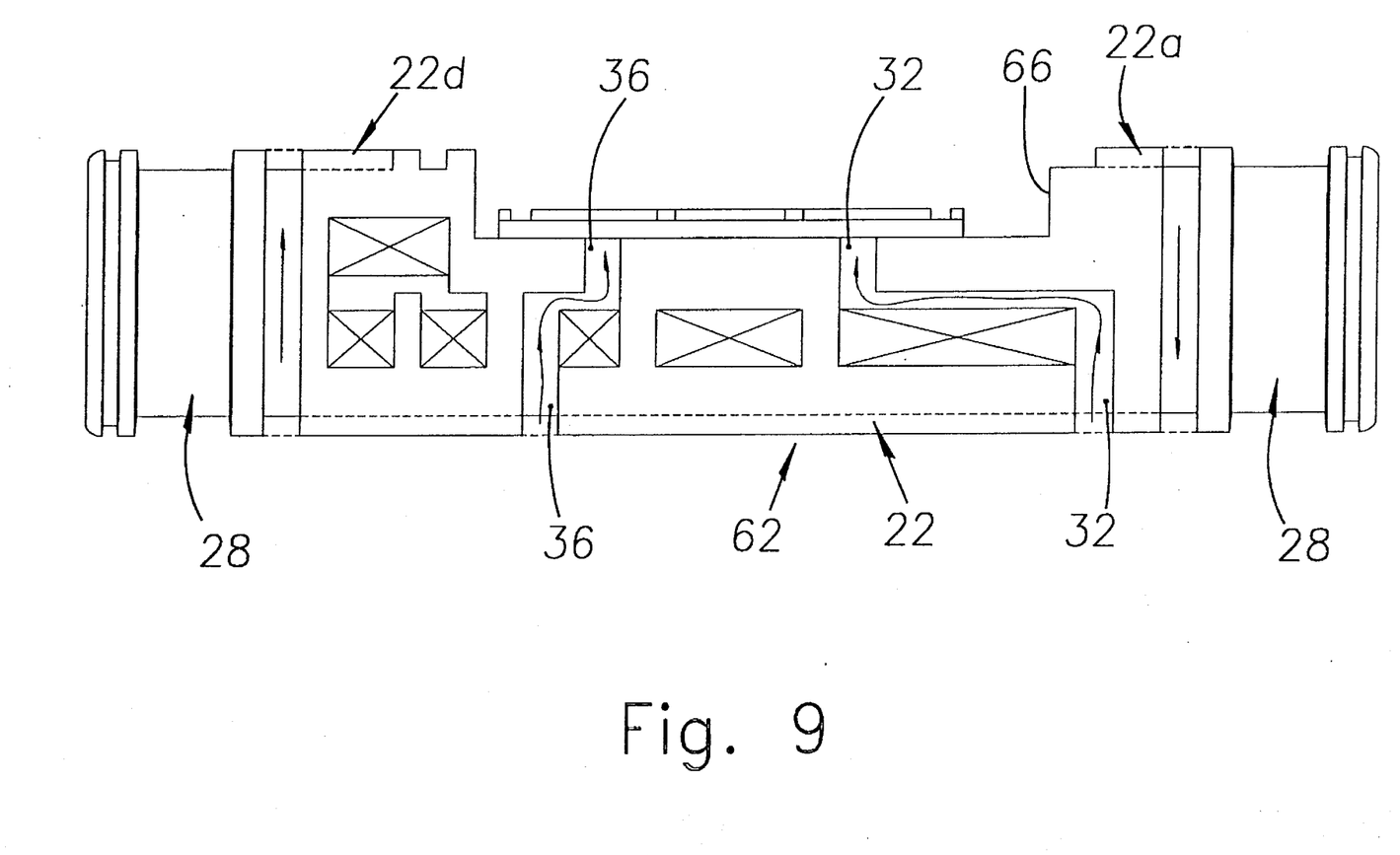
FIG. 9 is a side view of the main body element as viewed from the bottom of FIG. 8
Figure 10:
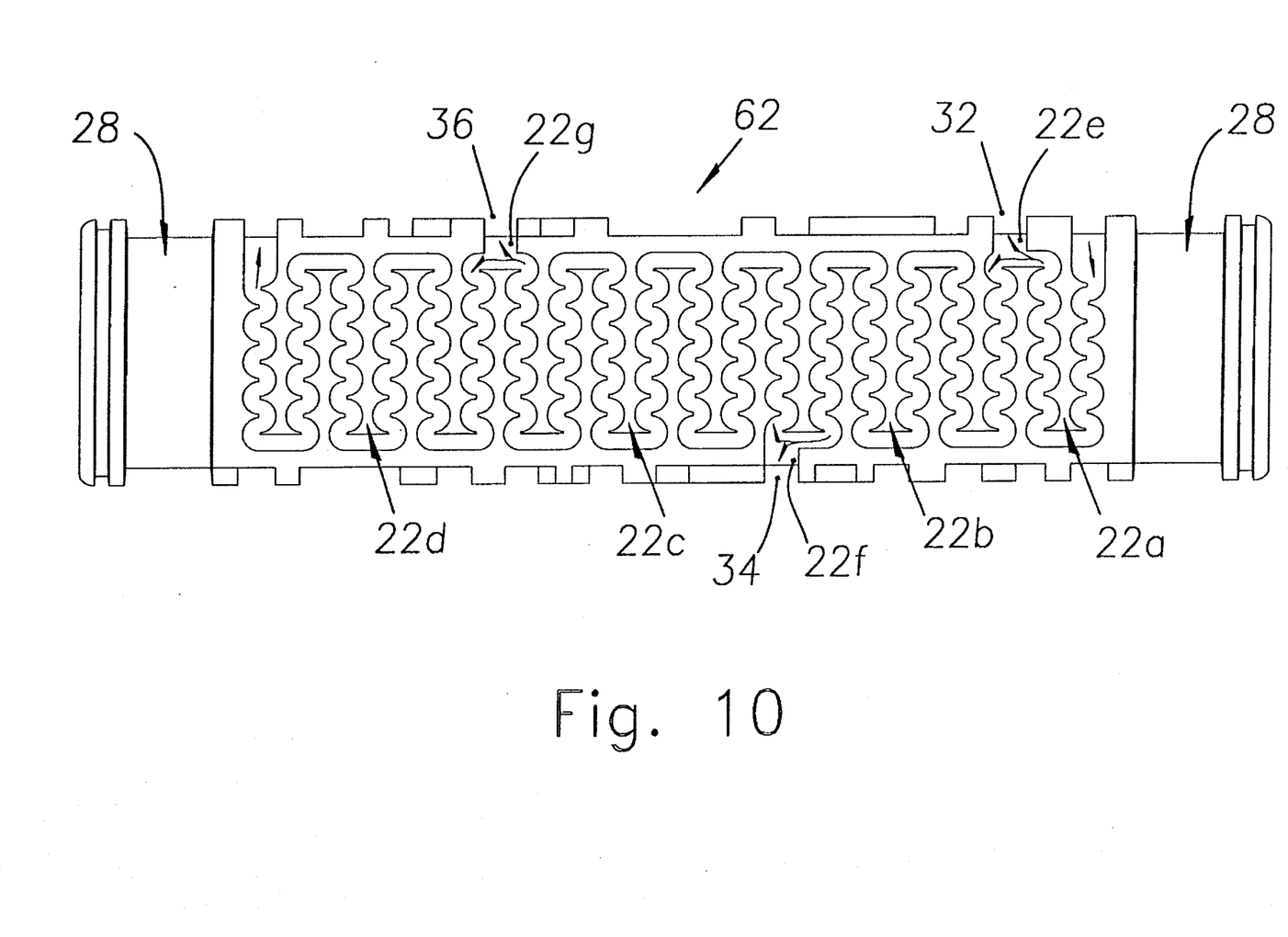
FIG. 10 is a bottom view of the main body element as viewed from the bottom of FIG. 9 showing the primary labyrinth sections.
Figure 11:
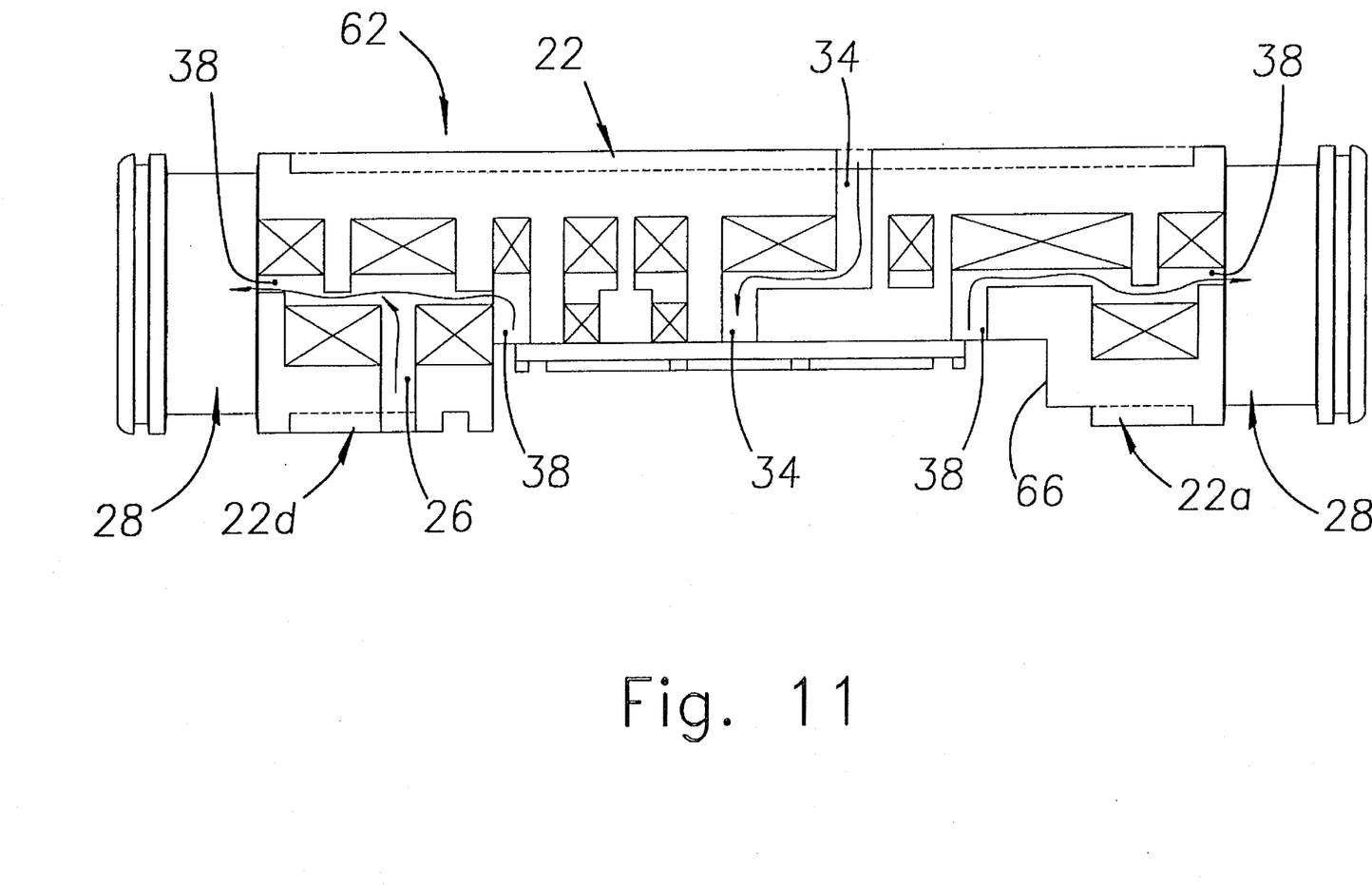
FIG. 11 is a side view of the main body element as viewed from the top of FIG. 8.

A recess 66 formed in one side of main element 62 receives a membrane 68, as shown in FIGS. 3 and 4, made of a suitably durable and resilient material, such as a silicon-based product, and a lid element 70, also referred to as a second body element, that also has channels complementing those of main element 62. Lid element 70 and main element 62 are structured to define a valve chamber 72 in which membrane 68 is captured. Membrane 68 sealingly divides valve chamber 72 into an inlet chamber 74 and three outlet chambers 76, 78 and 80. Inlet chamber 74 is in fluid communication with inner chamber 64 via an inlet 82. Membrane 68 is biased against a valve seat 84 surrounding inlet 82 by the lower surface 70a (as viewed in FIG. 6) of lid element 70 surrounding outlet chamber 78. Outlet chamber 78 is cylindrical in shape and is aligned with valve seat 84. As shown, this outlet chamber has a diameter that is larger than the diameter of the inlet valve seat. Inlet chamber 74 also has an outlet 86 that is in fluid communication with inlet end 24 of the labyrinth.

Outlet chambers 76, 78 and 80 are all cylindrically shaped. At the upper ends of the chambers, opposite from membrane 68, are respective side inlets 88, 90 and 92, and central outlets 94, 96 and 98 defined by outlet valve seats 100, 102 and 104. The outlet valve seats are of the same diameter, but seat 100 extends further toward membrane 68 than do the other two. Also, outlet chamber 80 has a smaller diameter than do the other two. Inlets 88, 90 and 92, respectively, are in fluid communication with the downstream ends 22e, 22f and 22g of labyrinth sections 22a, 22b and 22c.

Figure 12:
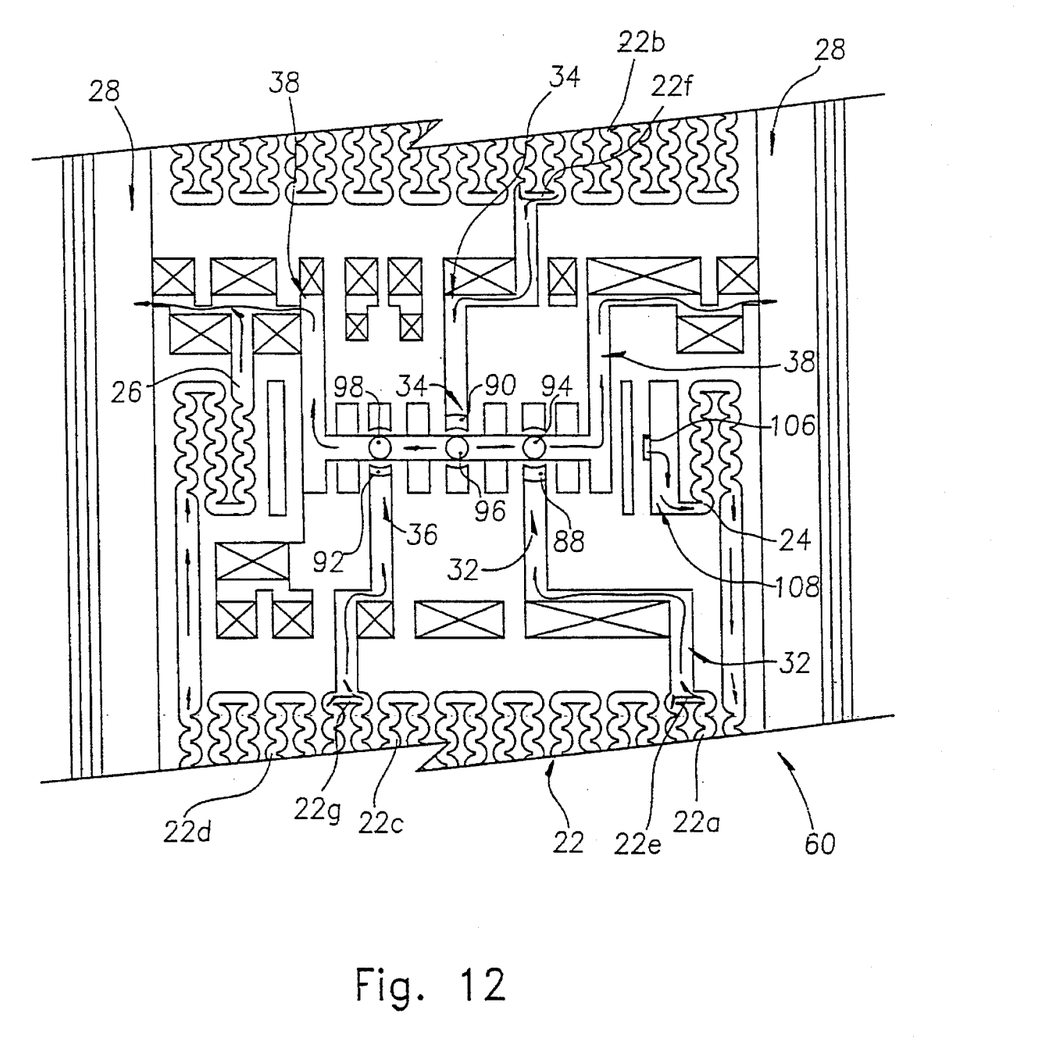
FIG. 12 is a composite image of the exterior of the insert of FIG. 2 as though it were a flat surface.

Referring particularly to FIGS. 3 and 12, the paths of water flow through the emitter are now described. As has been mentioned, water enters the emitter at inlet 82. Assuming the irrigation pipe water pressure is greater than the minimum needed to displace membrane 68 from inlet valve seat 84, water passes through inlet chamber 74 and out outlet 86. From outlet 86 it flows through a lateral slit 106 to a connecting channel 108 that connects the slit to labyrinth inlet end 24. Water then passes through labyrinth section 22a to section end 22e. End 22e is connected to next section 22b as well as, via a connecting channel 32, to first valve 42 containing side inlet 88 and center outlet 94. If membrane 68 has not closed seat 100, then most if not all of the water will escape the labyrinth at this point and pass to a pipe outlet, such as outlet 30, via bypass channel 38.

As valve 42 progressively closes, increasing amounts of water are prevented from passing through valve 42, passing instead through labyrinth section 22b. Section 22b ends at end 22f, which is connected to next section 22c, as well as to valve 44 via a connecting channel 34. Similarly, as valve 44 progressively restricts the passage of water therethrough, increasing amounts of water are forced into labyrinth section 22c to section end 22g. In corresponding fashion, end 22g is connected to the final labyrinth section, and also to valve 46 via connecting channel 36. Again, depending upon the water pressure in the pipe, and therefore the state of valve 46, a portion of the water is released through the valve and a portion is restricted to flow through labyrinth section 22d.

As has been mentioned, as internal water pressure increases, membrane 68 progressively is urged toward valve seats 100, 102 and 104. Due to the structure of outlet chambers 76, 78 and 80, the valves will ultimately close, or at least substantially restrict flow, serially for progressively higher pressures, with valve 42 closing first, valve 44 second and valve 46 last. Thus, as the pressure increases, water is caused to flow through increasingly longer effective lengths of the labyrinth. At any given time, then, some water flows through a given valve and some is directed past the valve to the next labyrinth section. Because of the use of a resilient membrane, water flows through the four labyrinth sections so as to equalize the resistance to flow in all paths. When the resistance becomes sufficient in a valve, a portion of the flow passes through the next section of the labyrinth. Flow can thus occur through more than one valve at a time, depending upon the structure of the valves and the associated labyrinth sections.

Emitter 20 further has the advantage of using membrane 68 as the active element in a retention valve for preventing flow through the emitter when the internal water pressure drops below the minimum pressure. It will be understood, that as with bypass valves 42, 44 and 46, retention valve 27 operates over a range of pressures. It does, however, completely close the inlet at some positive pressure. This assures that water will not drain from the irrigation pipe when pressure is removed, and potentially maintains the water in the pipe at a slight pressure. This assures rapid reactivation of the drip system when water pressure is reapplied.

Figure 13:
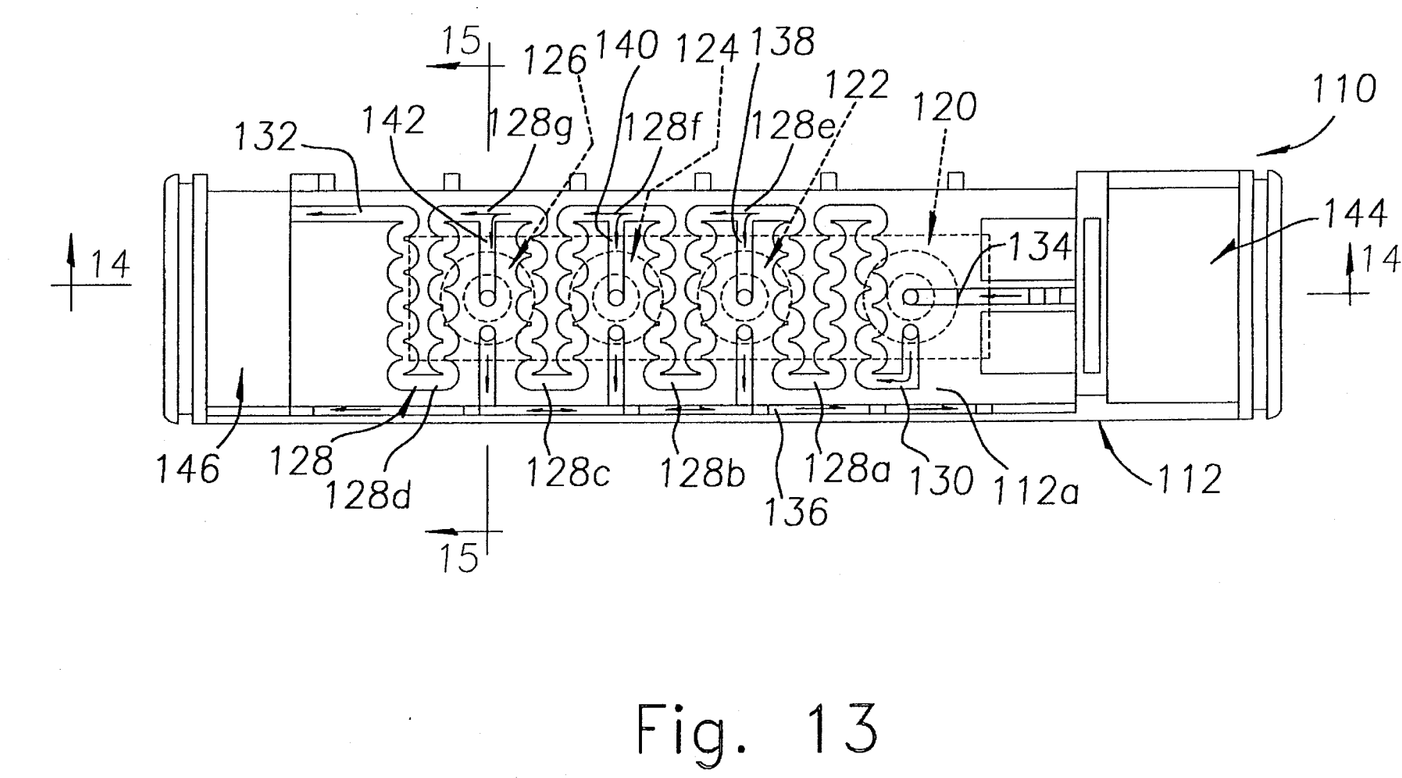
FIG. 13 is a top view of a second embodiment of an emitter insert having a body element and a flexible membrane constructed according to the schematic of FIG. 1 for insertion in an irrigation pipe.
Figure 14:
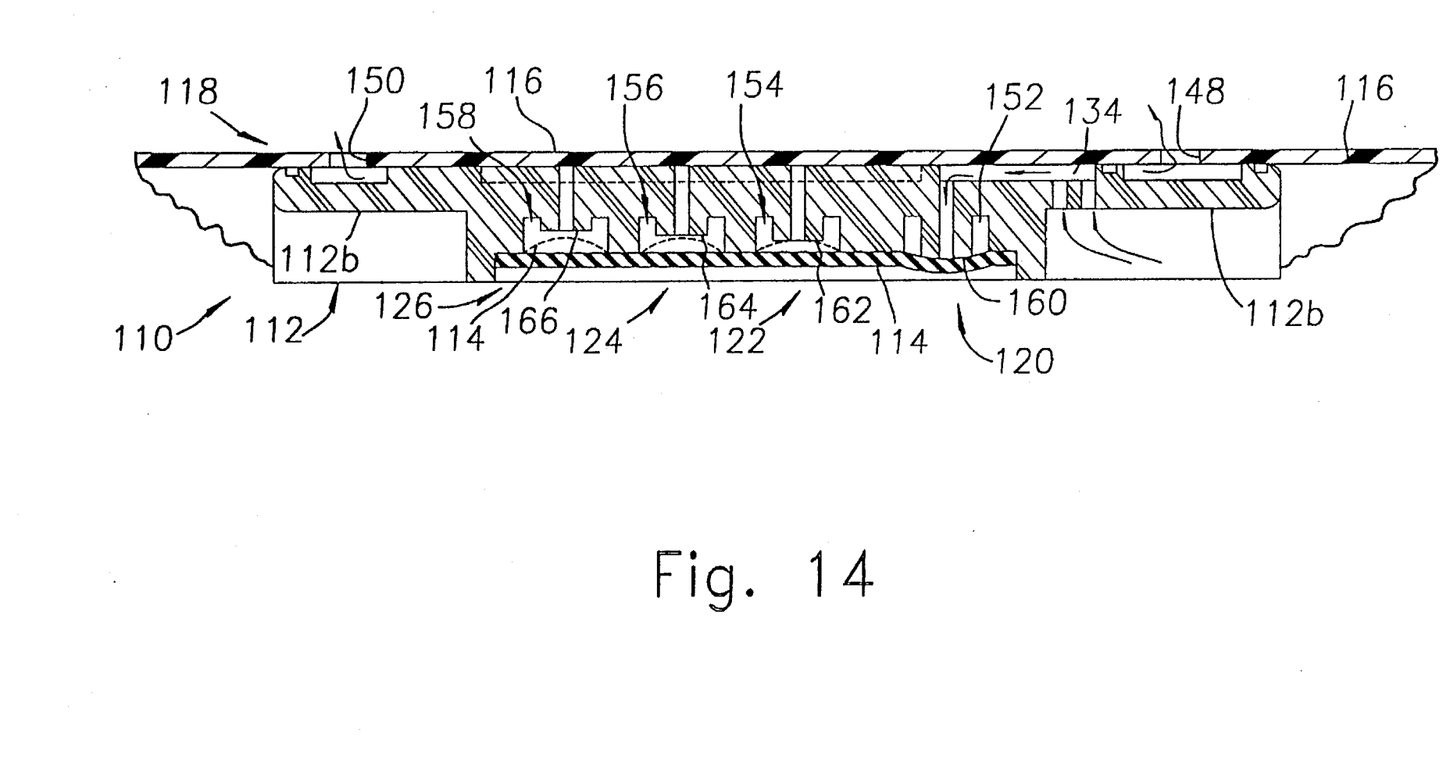
FIG. 14 is a cross section taken along line 14—14 in FIG. 13 with the insert positioned in an irrigation pipe.
Figure 15:
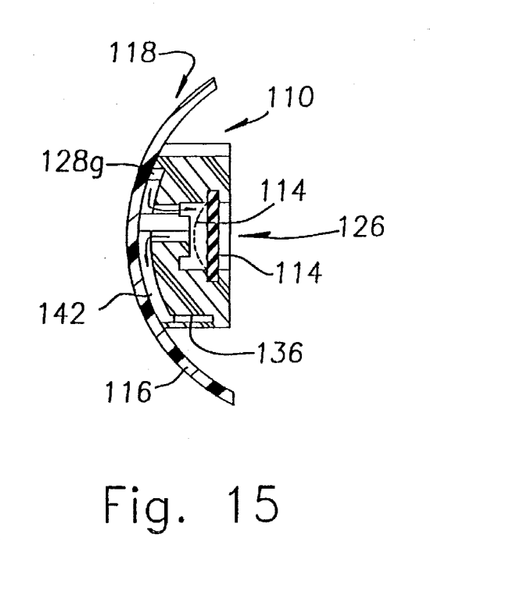
FIG. 15 is a cross section taken along line 15—15 in FIG. 15 with the insert positioned in an irrigation pipe.
Figure 16:
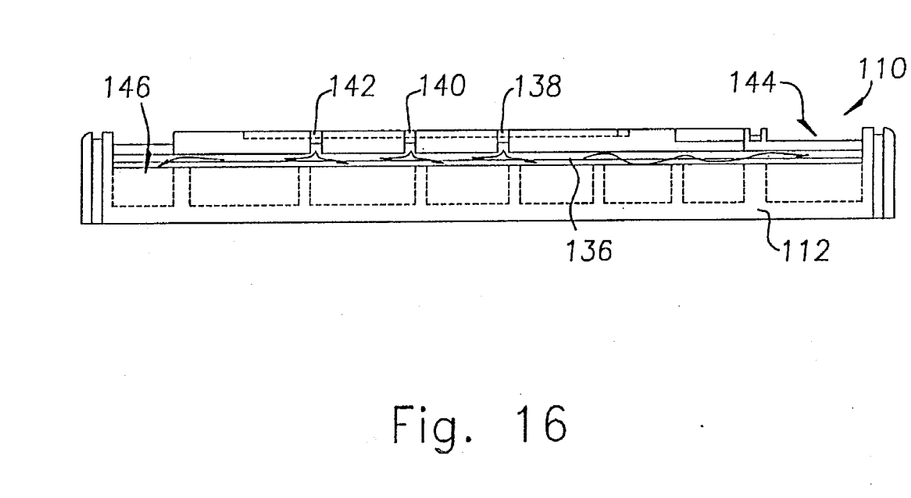
FIG. 16 is a side view of the emitter insert as viewed from the bottom of FIG. 13.

Referring now to FIGS. 13–16, a second preferred embodiment of the invention is now described. FIG. 13 shows a top view of an insert 110 having a single body element 112 and a flexible membrane 114, which membrane is shown in FIGS. 14 and 15. FIGS. 14 and 15 show respective cross sections taken along correspondingly numbered lines in FIG. 13 of the insert in an irrigation pipe 116. These two cross sections thus show the complete emitter 118 made according to the invention.

Emitter 118, although structured differently, functions very similarly to emitter 20 described with reference to FIGS. 2–12. Emitter 118 includes a retention valve 120 corresponding to valve 27, and three pressure-compensating valves 122, 124 and 126, corresponding in structure and function to valves 42, 44 and 46. Body element 112 has an outer surface 112a forming a labyrinth 128 when positioned against pipe 116, as shown in FIGS. 14 and 15. The labyrinth includes sections 128a, 128b, 128c and 128d. The body element also has an inner surface 112b that is exposed to the pipe interior.

The labyrinth includes an inlet end 130, an outlet end 132, and three intervening upstream section ends 128e, 128f and 128g for sections 128a, 128b and 128c, respectively. Inlet end 130 is coupled to the pipe interior by inlet channel 134 which passes through retention valve 120. Similarly, labyrinth section ends 128e, 128f and 128g are coupled to a bypass channel 136 by respective connecting channels 138, 140 and 142. These connecting channels pass through respective pressure-compensating valves 122, 124 and 126.

Bypass channel 136 extends along the length of the labyrinth and is coupled at opposite ends to outlet chambers 144 and 146. Each outlet chamber conducts fluid to the pipe exterior through respective openings 148 and 150. Outlet end 132 of the labyrinth is coupled to outlet chamber 146.

It is seen that membrane 114 is sealingly seated against the inner surface of body element 112 to form retention valve chamber 152 and pressure-compensating valve chambers 154, 156 and 158. The side of the membrane opposite from the valves is exposed to the pipe interior.

In the rest state, membrane 114 is seated against retention valve seat 160 and spaced from respective pressure-compensating valve seats 162, 164 and 166. It is seen that valve seats 162, 164 and 166 are progressively further distant from the membrane and that the associated valve chambers have like shapes. This provides for progressive operation of the pressure-compensating valves with increasing internal pipe water pressure on the membrane. The dashed outline illustrates the position of the membrane at an intermediate internal pipe pressure which is sufficient to close valve 122, to substantially restrict valve 124, and to restrict to a lesser degree valve 126. The function of valves 120, 122, 124 and 126 are thus substantially the same as provided in emitter 20, described previously. The only difference is that the membrane associated with the retention valve is not dual functional, since each valve is associated with a separate portion of the membrane.

Variations in form and detail may be made in the preferred embodiments described above without varying from the spirit and scope of the invention as defined in the claims as construed according to the law. For instance, pressure compensation may not be provided. The retention and bypass valves could be isolated and could use different valve-activating mechanisms. The structures defining how and under what pressures the valves operate also can be readily varied. For instance, the bypass valves could be located within a labyrinth section, with the labyrinth having branches, and the like. The bypass valves could also be identically structured and different membrane characteristics be used to control operation of the valves. Further, the internal water pressure applied to each valve membrane could be varied by the use of pressure-reducing passageways or the like. The shape and form of the emitter insert and the number of valves and labyrinth sections may be varied. A completely self-contained emitter could be inserted in a pipe. The preferred embodiments are thus provided for purposes of explanation and illustration, but not limitation.

I claim:

1. An in-line retention drip irrigation emitter comprising:
   means defining a flow-limiting passageway having an inlet end for receiving pressurized fluid from an irrigation pipe and an outlet end for conducting fluid to a pipe outlet opening; and
   first valve means responsive to fluid pressure in the pipe for closing the passageway when the fluid pressure in the pipe is below a minimum pressure and for opening the passageway when the fluid pressure in the pipe is above the minimum pressure, and thereby preventing the draining of water from within the pipe when the pipe fluid is at a pressure less than the minimum pressure.

2. An emitter according to claim 1 wherein the valve means includes a first valve chamber interposed the pipe interior and the passageway inlet end, the valve chamber having a first inlet and a first outlet, the first inlet being in fluid communication with the pipe interior and the first outlet being in fluid communication with the passageway inlet end, a first valve seat surrounding the first inlet, and a flexible membrane biased toward the valve seat.

3. An emitter according to claim 2 further comprising second valve means having a second valve chamber, a second inlet and a second outlet, the second inlet and the second outlet being exposed to the membrane opposite from the valve seat, the second inlet being in fluid communication with a first portion of the passageway intermediate the passageway ends and the second outlet being in fluid communication with the passageway outlet end, the membrane being responsive to fluid pressures greater than the minimum pressure for varying the flow between the second inlet and the second outlet in proportion to the difference in fluid pressures at the first and second inlets.

4. An emitter according to claim 3 further comprising third valve means having a third valve chamber, a third inlet and a third outlet, the third inlet and the third outlet being disposed on the same side of the membrane as the second inlet and second outlet, the third inlet being in fluid communication with a second portion of the passageway intermediate the first portion of the passageway and the passageway outlet end, and the third outlet also being in fluid communication with the passageway outlet end, the membrane being responsive to fluid pressures greater than the minimum pressure for varying the flow between the third inlet and the third outlet in proportion to the difference in fluid pressures at the first and third inlets.

5. An emitter according to claim 4 wherein the second and third valve means are adapted to define respective first and second ranges of pressures over which the flow of fluid is varied through the second and third outlets, with the second range of pressures having a higher maximum pressure than the first range of pressures.

6. An emitter according to claim 5 wherein the third outlet is positioned further from the membrane than the second outlet.

7. An emitter according to claim 5 wherein the second and third valve means, respectively, include first and second chamber seats against which the membrane seats when the first inlet fluid pressure is greater than the minimum pressure, thereby sealing the first and second chambers relative to each other.

8. An emitter according to claim 7 wherein the first and second chamber seats define first and second openings with the first chamber seat opening being larger than the second chamber seat opening, thereby allowing the membrane to flex into the first chamber further than into the second chamber for a given pressure.

9. An emitter according to claim 2 further comprising a sleeve and at least a partially cylindrical body intimately received in the sleeve and having an outer surface in physical contact with an inner surface of the sleeve, the passageway being formed between the body outer surface and the sleeve inner surface.

10. An emitter according to claim 9 wherein the body includes a first body element having a recess containing the first inlet and first outlet and a second body element mounted in the recess, the first and second body elements defining the first valve chamber.

11. An emitter according to claim I further comprising a sleeve and at least a partially cylindrical body intimately received in the sleeve and having an outer surface in physical contact with an inner surface of the sleeve, the passageway being formed between the body outer surface and the sleeve inner surface.

12. A pressure-compensating in-line retention drip irrigation emitter comprising:
   a sleeve having an outlet opening;
   a body received in the sleeve and having an outer surface mountable in physical contact with an inner surface of the sleeve;
   means mounted relative to the body for defining a flow-limiting passageway having an inlet end and an outlet end for conducting fluid to the sleeve outlet opening;
   a first valve chamber formed in the body having an open end and first and second inlets and first and second outlets, the first inlet being for receiving pressurized fluid and the first outlet being in fluid communication with the passageway inlet end, a first valve seat surrounding the first inlet;
   a second valve chamber formed in the body and having an open end and a second inlet and a second outlet, the second inlet and second outlet being spaced from the first inlet and the first outlet, the second inlet being in fluid communication with an intermediate portion of the passageway and the second outlet being in fluid communication with the passageway outlet end; and
   a flexible membrane mounted relative to the body for covering the open ends of the first and second valve chambers, the membrane being biased toward the valve seat for closing the first inlet when the inlet fluid pressure below a minimum pressure and for opening the first inlet when the inlet fluid pressure is above the minimum pressure, and thereby preventing the draining of water through the emitter when the inlet fluid pressure is below the minimum pressure, the membrane further flexing toward the second outlet for pressures greater than the minimum pressure for varying the flow of fluid passing between the second inlet and the second outlet, and thereby varying the amount of fluid passing through the passageway between the intermediate portion and the outlet end.

13. An emitter according to claim 12 wherein the body includes a first body element having a recess containing the first inlet and first outlet and a second body element mounted in the recess and containing the second inlet and second outlet, the first and second body elements defining, respectively, the first and second valve chambers.

14. An emitter according to claim 13 wherein the membrane has a perimeter fixed between the first and second body elements, and the first and second valve chambers are in alignment on opposite sides of the membrane.

15. An emitter according to claim 12 further comprising a third valve chamber formed in the body with an open end covered by the membrane and a third inlet and a third outlet, the third inlet being in fluid communication with a second portion of the passageway intermediate the first portion of the passageway and the passageway outlet end, and the third outlet also being in fluid communication with the passageway outlet end, the membrane being responsive to fluid pressures greater than the minimum pressure for varying the flow between the third inlet and the third outlet in proportion to the difference in fluid pressures across the membrane.

16. An emitter according to claim 15 wherein the body is adapted to define respective first and second ranges of pressures over which the flow of fluid is varied through the second and third outlets, with the second range of pressures having a higher maximum pressure than the first range of pressures.

17. An emitter according to claim 16 wherein the third outlet is positioned further from the membrane than the second outlet.

18. An emitter according to claim 16 wherein the membrane seals the second chamber from the third chamber when the first inlet fluid pressure is greater than the minimum pressure.

19. An emitter according to claim 17 wherein the open end of the second valve chamber is larger than the open end of the third valve chamber, thereby allowing the membrane to flex into the second valve chamber further than into the third valve chamber for a given pressure.

* * * * *